US 6,654,915 B1

United States Patent
Lu et al.

(10) Patent No.: US 6,654,915 B1
(45) Date of Patent: Nov. 25, 2003

(54) AUTOMATIC FAULT MANAGEMENT SYSTEM UTILIZING ELECTRONIC SERVICE REQUESTS

(75) Inventors: Scott Lu, Mission Viejo, CA (US); Trent Lee England, Mission Viejo, CA (US); Phen Cheng, Laguna Niguel, CA (US); Bong Jae Lee, Laguna Niguel, CA (US); Kathy Yishin Jaing, Irvine, CA (US)

(73) Assignee: Unisys Corporation, Blue Bell, PA (US)

(*) Notice: Subject to any disclaimer, the term of this patent is extended or adjusted under 35 U.S.C. 154(b) by 543 days.

(21) Appl. No.: 09/658,959

(22) Filed: Sep. 11, 2000

(51) Int. Cl.[7] .................................................. G06F 11/00
(52) U.S. Cl. ........................... 714/57; 714/43; 714/47
(58) Field of Search ........................ 714/43, 47, 57

(56) References Cited

U.S. PATENT DOCUMENTS

| | | | | |
|---|---|---|---|---|
| 4,166,290 A | * | 8/1979 | Furtman et al. ............. | 714/47 |
| 5,432,715 A | * | 7/1995 | Shigematsu et al. ......... | 702/188 |
| 5,519,830 A | * | 5/1996 | Opoczynski ................. | 714/4 |
| 5,572,672 A | * | 11/1996 | Dewitt et al. ................ | 714/47 |
| 5,581,482 A | * | 12/1996 | Wiedenman et al. ......... | 702/186 |
| 5,684,945 A | * | 11/1997 | Chen et al. .................. | 714/20 |
| 5,704,036 A | * | 12/1997 | Brownmiller et al. ........ | 714/43 |
| 5,812,756 A | * | 9/1998 | Taylor .......................... | 714/30 |
| 5,819,028 A | * | 10/1998 | Manghirmalani et al. .... | 714/57 |
| 5,872,912 A | * | 2/1999 | Brownmiller et al. ........ | 714/47 |
| 5,935,262 A | * | 8/1999 | Barrett et al. ................ | 714/46 |
| 6,134,676 A | * | 10/2000 | VanHuben et al. .......... | 714/39 |
| 6,167,538 A | * | 12/2000 | Neufeld et al. .............. | 714/47 |
| 6,205,413 B1 | * | 3/2001 | Bisdikian et al. ............ | 703/24 |
| 6,233,531 B1 | * | 5/2001 | Klassen et al. ............... | 702/80 |
| 6,249,883 B1 | * | 6/2001 | Cassidy et al. .............. | 714/42 |
| 6,351,724 B1 | * | 2/2002 | Klassen et al. .............. | 702/186 |
| 6,360,337 B1 | * | 3/2002 | Zak et al. ..................... | 714/47 |

OTHER PUBLICATIONS

Microsoft Corp., Enhancements to Management, Secutrity and Availability, 2003, Microsoft Cor. p. 2, http://www.microsoft.com/ntsever/productinfo/terminal/NT4SP4.asp.*

* cited by examiner

Primary Examiner—Nadeem Iqbal
Assistant Examiner—Timothy M. Bonura
(74) Attorney, Agent, or Firm—Alfred W. Kozak; Mark T. Starr; Lise A. Rode

(57) ABSTRACT

An automatic fault management system can monitor multiple platforms in a digital network to sense software and hardware malfunctions. An Event Log stores the details of each malfunction and enables an electronic service requester generator to develop formatted packets of information for transmittal to a remote service center. Administrative and monitor screens are made available to control and view each packet sent out and its status of receipt and return acknowledgment data.

4 Claims, 24 Drawing Sheets

Electronic Service Request Administrator

| System Information | Customer Information | Formatter Configuration | Central Service Configuration | Fault Criteria |

System Style: `ess1234567z`

Serial Number: `012345678`

Software Release:

Polling Interval (min): `2`

☐ Trace Enabled

[ OK ]  [ Cancel ]  [ Apply ]  [ Help ]

▶ 1

*Required

*Figure 2A*

| Electronic Service Request Administrator | | | | | ? X |
|---|---|---|---|---|---|
| System Information | Customer Information | Formatter Configuration | Central Service Configuration | Fault Criteria | |

Name: * [Scott Lu]  Contact: * [Scott Lu]

Address: * [25725 Jeronimo Road]  Phone Number: * [949-380-6803]
Example: 203-535-2842

Address (cont.): [ ]  Console Phone: [949-380-5147]

City: * [MissionViejo]  Remote Phone: [ ]

State: * [CA]  Department: [ ]

Zip Code: * [92691]  CUIC: * [7]

Customer ID: * [012345678]

*Required

[OK]  [Cancel]  [Apply]  [Help]

*Figure 2B*

Electronic Service Request Administrator

| System Information | Customer Information | Formatter Configuration | Central Service Configuration | Fault Criteria |

Computer Name: MV-LUS3

Event Source: ESRTestPacket

File Name: Fmt.MainLT.exe

Port Number: 7000

Add
Delete

Formatter Programs
[FMT#]-[ComputerName]-[EventSource]-[FileName]-[Port#]

[FMT0]-[MV-LUS3]-[ESRTestPacket]-[FmtMainLT.exe]-[7000]
[FMT1]-[MV-LUS3]-[FaultEvent]-[FmtMainLT.exe]-[7001]
[FMT2]-[MV-LUS3]-[OSR7700-6700]-[FmtMainPT.exe]-[7002]
[FMT3]-[MV-LUS3]-[LocalResponseAgent]-[FmtMain.exe]-[7003]
[FMT4]-[MV-LUS3]-[esAnalysis]-[FmtMainPT.exe]-[7004]
[FMT5]-[MV-LUS3]-[LX5000]-[FmtMain.exe]-[7005]
[FMT6]-[MV-LUS3]-[SmartFJ]-[FmtMain.exe]-[7006]
[FMT7]-[MV-LUS3]-[EventAgent]-[FmtMainFA.exe]-[7007]

OK    Cancel    Apply    Help

*Figure 2C*

| Electronic Service Request Administrator | | | | | ? ✕ |
|---|---|---|---|---|---|
| System Information | Customer Information | Formatter Configuration | Central Service Configuration | Fault Criteria | |

Computer Name: * `MV-LUS3`

Port Number: * `7896`

Electronic Service Request Packets

⦿ Test

[ Send Packet ]

*Required

[ OK ]  [ Cancel ]  [ Apply ]  [ Help ]

*Figure 2D*

Electronic Service Request Administrator

| System Information | Customer Information | Formatter Configuration | Central Service Configuration | Fault Criteria |
|---|---|---|---|---|

| Event Source | Event Type | Company | Event ID | Description | Frequency | Duration |
|---|---|---|---|---|---|---|
| LX5000 | Error | | | | | |
| ESRTestPac | Warning | | | | 1 | |
| Local Respon | Error | | | Power Supply F6 | 1 | |
| Local Respon | Error | | | Status Changed | 1 | |
| Local Respon | Error | | | Cooling Device | 1 | |
| Local Respon | Error | | | Power Unit Redu | 1 | |
| Local Respon | Warning | | | Single Bit Memo | 5 | 5 |
| Local Respon | Error | | | Processor Therm | 1 | |
| Local Respon | Error | | | Processor Intern | 1 | |
| Fault Event | Error | ESR | | | | |
| Fault Event | Warning | ESR/Alert | | | 1 | |
| Fault Event | Error | ESR/Alert | | | 1 | |
| Fault Event | Warning | ESR | | | 1 | |
| EsAnalysis | Warning | ESR | | | 1 | |
| OSR7700-670 | Warning | | | | 1 | |

[ OK ]  [ Cancel ]  [ Apply ]  [ Help ]

*Figure 2E*

| Event Viewer – Application Log on \\MV-LUS3 | | | | | | |
|---|---|---|---|---|---|---|
| Log View Option Help | | | | | | |
| Date | Time | Source | Category | Event | User | Computer |
| 7/11/00 | 3:47:08 PM | ESRGenLogEvent | None | 17 | N/A | MV-LUS3 |
| 7/11/00 | 3:47:08 PM | ESRGenLogEvent | None | 17 | N/A | MV-LUS3 |
| 7/11/00 | 3:42:48 PM | Unisys ESR Central | None | 3 | N/A | MV-LUS3 |
| 7/9/00 | 9:58:36 PM | Active Server Page | None | 3 | N/A | MV-LUS3 |
| 7/7/00 | 4:06:58 PM | ESRGenLogEvent | None | 16 | N/A | MV-LUS3 |
| 7/7/00 | 4:06:53 PM | Legato NetWorker F | None | 0 | N/A | MV-LUS3 |
| 7/7/00 | 4:06:49 PM | MSDTC | SVC | 4097 | N/A | MV-LUS3 |
| 7/7/00 | 4:06:49 PM | MSDTC | CM | 4156 | N/A | MV-LUS3 |
| 7/7/00 | 4:06:49 PM | MSDTC | CM | 4156 | N/A | MV-LUS3 |
| 7/7/00 | 3:28:38 PM | ESRGenLogEvent | None | 16 | N/A | MV-LUS3 |
| 7/7/00 | 3:28:33 PM | Legato NetWorker F | None | 0 | N/A | MV-LUS3 |
| 7/7/00 | 3:28:29 PM | MSDTC | SVC | 4097 | N/A | MV-LUS3 |
| 7/7/00 | 3:28:28 PM | MSDTC | CM | 4156 | N/A | MV-LUS3 |
| 7/7/00 | 3:28:28 PM | MSDTC | CM | 4156 | N/A | MV-LUS3 |
| 7/6/00 | 1:02:53: PM | NetWorker Remote | Client | 8 | N/A | MV-LUS3 |
| 7/6/00 | 1:02:53: PM | NetWorker Remote | ClientFile | 1 | N/A | MV-LUS3 |
| 7/6/00 | 12:23:55: PM | NetWorker Remote | Client | 6 | N/A | MV-LUS3 |
| 7/6/00 | 12:23:54: PM | NetWorker Remote | Client | 8 | N/A | MV-LUS3 |
| 7/6/00 | 12:23:54: PM | NetWorker Remote | ClientFile | 1 | N/A | MV-LUS3 |
| 7/6/00 | 12:23:54: PM | NetWorker Remote | Client | 6 | N/A | MV-LUS3 |

*NT Event Log*

*Figure 3A*

Determining Failure – ISC Console

*Determining Failure – Component*

*Determining Failure – Fan*

Determining Failure – Temperature

*Determining Failure – Voltage*

Electronic Service Request Administrator ? X

| System Information | Customer Information | Formatter Configuration | Central Service Configuration | Fault Criteria |

| Event Source | Event Type | Catagory | Event ID | Description | Frequency | Duration (0) |
|---|---|---|---|---|---|---|
| LX5000 | Error | | | | 1 | |
| ESRTestPacket | Warning | | | | 1 | |
| Local Respon | Error | | | Power Supply Failed | 1 | |
| Local Respon | Error | | | Status Changed to Upper Critical | 1 | |
| Local Respon | Error | | | Cooling Device Failure | 1 | |
| Local Respon | Error | | | Power Unit Redundancy Lost | 1 | |
| Local Respon | Warning | | | Single-Bit Memory Error | 5 | 5 |
| Local Respon | Error | | | Processor Thermal Trip | 1 | |
| Local Respon | Error | | | Processor Internal Error | 1 | |
| Fault Event | Error | ESR | | | 1 | |
| Fault Event | Warning | ESR/Alert | | | 1 | |
| Fault Event | Error | ESR/Alert | | | 1 | |
| Fault Event | Warning | ESR | | | 1 | |
| EsAnalysis | Warning | ESR | | | 1 | |
| OSR7700-670 | Warning | | | | 1 | |
| VM ClearPath | Error | | | | 1 | |
| SmartFJ | Error | | | | 1 | |

[ OK ]  [ Cancel ]  [ Apply ]  [ Help ]

*Fault Criteria Database*
*Figure 6*

| Electronic Service Request Monitor | | | |
|---|---|---|---|
| File Edit View Tools Help | | | |
| Description | Computer | Severity | Status |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| √ Hardware ESR testing | MV-LUS3 | INDE... | ESR packet send to URCI was completed. SACK was received |
| For Help, press F1 | Total: 100Packets 100 | Packets 1:100 | LCNR 130 NUM |

*Monitor User Interface*
Figure 7

*ODBC Data Source Administrator*

ESR Central Service Database

ESR Central Configuration Table

AUTOMATIC FAULT MANAGEMENT SYSTEM UTILIZING ELECTRONIC SERVICE REQUESTS

CROSS-REFERENCES TO RELATED APPLICATIONS

This case is related to co-pending application U.S. Ser. No. 09/731,504 ENTITLED "Electronic Service Request Generator For Automatic Fault Management Systems".

FIELD OF THE INVENTION

This disclosure applies to the Microsoft Windows NT/2000 platform and involves automatic detection of system or application errors through the viewing of an NT event log. This error information is sent to a central application and scheduled for delivery to a support center for action.

BACKGROUND OF THE INVENTION

Extensive networks of servers running Microsoft Windows NT/2000 platform will sometimes have hardware failures, processing problems, application problems, and certain error situations which demand immediate attention that could be very costly if corrective actions are not taken very rapidly.

It is desirable that some system or arrangement be configured in order to detect any particular faults in hardware or software in the operating platform so that immediate responsive action can be taken. This would preferably be done on an instantaneous basis where some detection or recognition of the fault or error would be immediately transmitted to a remote monitor which can diagnose the situation and respond rapidly with corrective action.

Thus, it would be most desirable to have some system in the local platform completely monitor and detect any hardware or software faults and package them for transmittal to a module which could be designated herein as a Electronic Service Request Central Service. This Central Service would supply a database providing system information, connection information, retry information, trace information and delivery schedules, which could take the hardware or software fault detection information and transmit it to a remote Electronic Service Request support center for analysis and corrective action.

The present system provides for the automatic delivery of fault detection information placed in packets which can then be scheduled for delivery to a remote support center unit for action

SUMMARY OF THE INVENTION

A system and method is provided whereby a client computer platform is provided with hardware/software fault detection programs which can then be generated to form a packet file in a specialized format under control of an Electronic Service Request administrator.

The fault information is sent via a formatted packet to an Electronic Service Request Central Service computer system which provides a configuration database holding connection information, retry information, trace information and delivery schedules. The formatted fault information is received by the Central Service and is scheduled for transmission to a remote Electronic Service Request support center. Here, the received information will be analyzed, diagnosed and, in the meanwhile, a contact number will be transmitted back to the Electronic Service Request Central Service for implementation of corrective action.

BRIEF DESCRIPTION OF THE DRAWINGS

FIG. 2 shows the windows screens for the ESR Administrator which are indicated as FIGS. 2A, 2B, 2C, 2D, and 2E;

FIG. 3A is a screen of the Event Log Mechanism;

FIG. 6 is a screen indicating typical items in the Fault Criteria Database;

FIG. 7 is a screen indicating typical items seen on the Monitor User Interface;

GLOSSARY ITEMS

Figure 1:
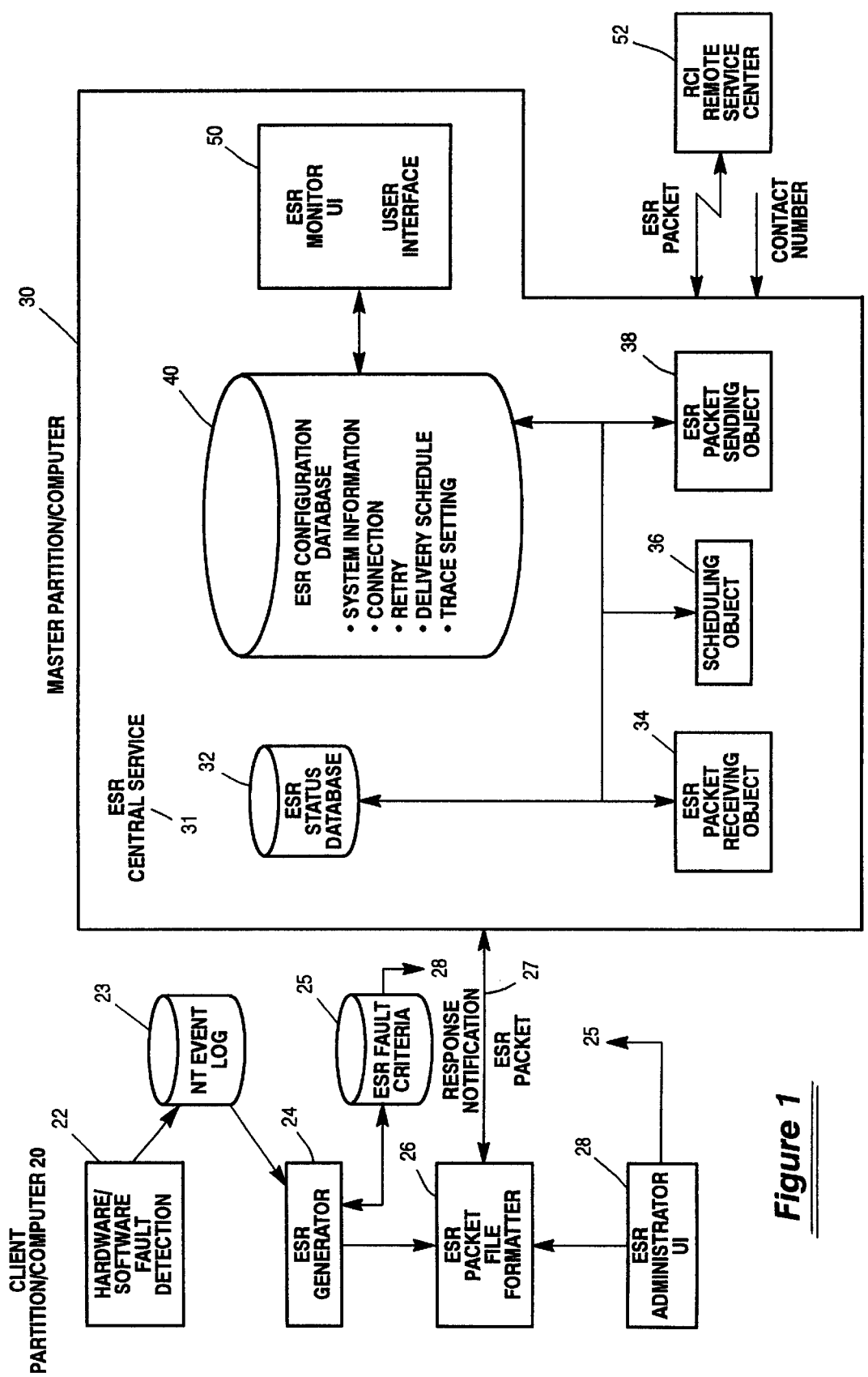
FIG. 1 is a generalized view of the Electronic Service Request client computer and Central Service operations.

APPLET: A small piece of code that can be transported over the Internet and executed on the recipient's machine. Such programs are often embedded in line as objects in HTML documents on the World Wide Web.

ELECTRONIC SERVICE REQUEST: A data packet containing information on system or application errors. This packet information originates from the Generator, which sends it to a Formatter program for data formatting. The Formatter program sends the packet electronically to the Central Service, which in turn sends it via the Remote Communications Interface (RCI) to a remote service center for action and resolution.

ESR CENTRAL SERVICE: (Electronic Service Request Central Service.) This is an executable program that runs as a background task. It is controlled by the Windows NT Service Control Manager (SCM). The Electronic Service Request Central Service (ESRCS) receives information on system and application errors from a Formatter Program designated as the ESR Formatter Program. This information is included in a data packet that describes the problem that has occurred and also the severity of the problem. The ESR Central Service then schedules and sends the data packet to the Remote Communications Interface (RCI). Electronic Service Request Central Service begins to run at systems startup. It can be stopped and started by using the Services function of the Windows NT Control Panel.

HARDWARE/SOFTWARE FAULT DETECTOR: This is a unit which is used in the client's computer platform in order to sense, measure and detect any type of hardware or software fault which may occur.

ESR GENERATOR: This is the electronic service request generator which receives the fault information from the hardware/software fault detection unit and transmits it to a packet file formatter for developing a specialized message.

ESR ADMINISTRATOR: This is a specialized user interface which provides instructions to the packet file formatter in order to initiate the development of a ESR packet for transmittal to the ESR central service module which is designated as the master partition computer platform.

ESR PACKET FILE FORMATTER: This is a program which receives fault information from the Generator and formats the data into a packet according to a packet specification.

WINSOCK: This is a specialized protocol which is a shortened name for Windows sockets. It involves an application programming interface standard for software that provides a TCP/IP interface under Windows. The Winsock standard was developed out of a Birds of a Feather (BOF) discussion that arose among software vendors at a UNIX conference in 1991 and gained support of software developers including Microsoft.

ESR STATUS DATABASE: A database that keeps track of packet status information for Electronic Service Requests.

PACKET READER: This is a field which involves a four-byte field called a preamble field to indicate the start of an electronic service request transaction, and it also includes a data length field which is a ten-byte ASCII field containing the decimal size, in bytes, of the data packet.

ESR PACKET RECEIVING OBJECT: This is a object code that is a machine readable code which in object oriented programming involves a variable comprising both routines and data, each of which is treated as a discrete entity.

SCHEDULING OBJECT: This is a program which assesses and evaluates the packet file formatter messages and decides in what priority or schedule they are to be forwarded on.

ESR PACKET SENDING OBJECT: This is a program which takes the packet file formatter messages from the scheduling object and communicates with the configuration database in order to accumulate customer information, connection information, and service scheduling information so that an expanded message may be transmitted and sent to a remote electronic service request monitoring unit, which is a user interface.

CONFIGURATION DATABASE: This is a database in the master partition computer platform of the central service which holds applicable information regarding methods of setting up connections and applying a service schedule to monitor and handle the client computer platform which has undergone fault detection.

RAS: Remote Access Service.

REMOTE COMMUNICATIONS INTERFACE (RCI): This is a remote unit for receiving test packets from the central service unit in order to check whether the network mechanism is functioning correctly.

SERVICE CONTROL MANAGER (SCM): A Windows application that can start, stop, pause, or continue Windows services, SCM maintains a list of services installed in the Windows operating system, and it can add or remove services from this list.

NACK: Negative acknowledgment (NACK). A data packet returned by the Remote Communications Interface (RCI) to indicate that an Electronic Service Request packet failed to process. The packet also includes an error code and a descriptive error message.

SACK: Successful acknowledgement (SACK). A data packet returned by the Remote Communications Interface (RCI) to acknowledge that an Electronic Service Request packet was processed successfully. The packet also includes the customer contact number assigned by URCI.

ODBC: This is the open database connectivity concept used by Microsoft WOSA (Windows Open Systems Architecture) structures. It provides an interface with a common language for Windows applications to gain access to a database on a network.

WOSA: This is Windows Open Systems Architecture.

TRACE SETTING: The Central Service trace facility is a diagnostic tool that enables program developers to keep track of the Central Service processes and problems. For example, you can set an option to keep track of the variable values used within the Central Service.

ISC: Intel Server Control is an Intel server management application.

ESR TEST PACKET: This is a test packet used to verify that the electronic service request mechanism is functioning properly.

ESRDIAG PACKET: This is a test packet used by the central service personnel when they are configuring, testing, or diagnosing the electronic service request mechanism.

ESRRFU PACKET: This is a test packet used as a means to verify that the service request process goes "end to end" and will route the test packet to a service provider who will respond to the electronic service request by calling the site.

SEND TEST PACKET: This relates to the three types of test packets which are utilized for the electronic central system to test out the electronic service request process with the Remote Communication Interface (RCI).

DESCRIPTION OF PREFERRED EMBODIMENT

FIG. 1 shows an overall drawing of the Electronic Service Request (ESR) Central Service components and System Architecture. As seen in FIG. 1, there is a first partition called the "Client Partition/Computer" 20 and there is a second partition called the "Master Partition/Computer", 30.

The Client-Server Partition/Computer 20 is seen to have a hardware/software fault detection unit 22 which connects to an Event Log 23, which is being monitored by the Generator 24. The Generator 24 then communicates with the Formatter 26. The ESR Formatter 26 also receives configuration information from the ESR Administrator 28. The ESR Packet File Formatter 26 is provided with a bi-directional communication link to the Master Partition/Computer, 30, where the transmission of an ESR packet occurs, and then a response, called the Response Notification 27 from the Master Partition/Computer, 30.

The ESR Generator 24 will monitor a Windows NT Event Log 23 to detect the system hardware or software faults. The ESR generator 24 works with the Fault Criteria Database 25 to compare and identify the faults when they occur and an ESR generator 24 will notify the Formatter 26 with the fault information. Then a data packet will be formatted by Formatter 26. The User Interface Administrator 28 can access the Criteria Database 25 to configure the fault criteria.

The Master Partition/Computer 30 is designated as the ESR (Electronic Service Request) Central Service. This Central Service is seen to consist of a ESR status database 32 which is connected to the ESR packet receiving object, 34. Both of these units are then connected to a Scheduling Object, 36, and also an ESR-packet sending object 38. The ESR Central Service 31 connection is also made to the ESR configuration database 40 which holds system information, connection information, retry information, trace information and delivery schedules.

Then peripherally connected to the Master Partition/Computer, there are two other units, one of which is the ESR Monitor User Interface (UI) 50 and the RCI unit 52 which connects to the Master Partition/Computer through use of a Winsock TCP connection.

The ESR Central Service 31 is an executable program that runs as a background task and is controlled by the Service Control Manager (SCM). The SCM is part of the NT and is utilized through the screen of FIG. 5.

Figure 5:
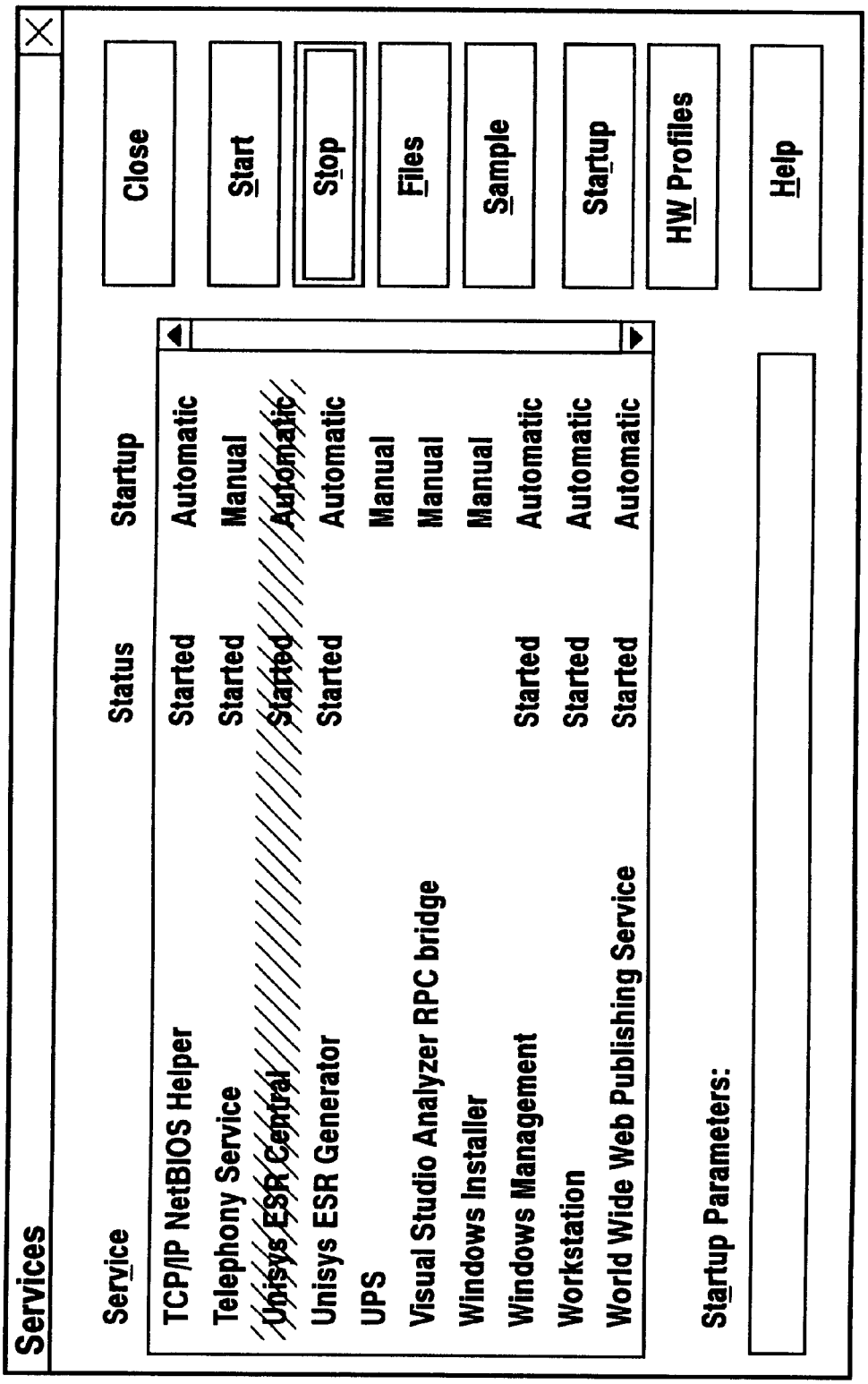
FIG. 5 is a drawing of a screen showing the window applicable to the Service Control Panel Applet.
Figure 5A:
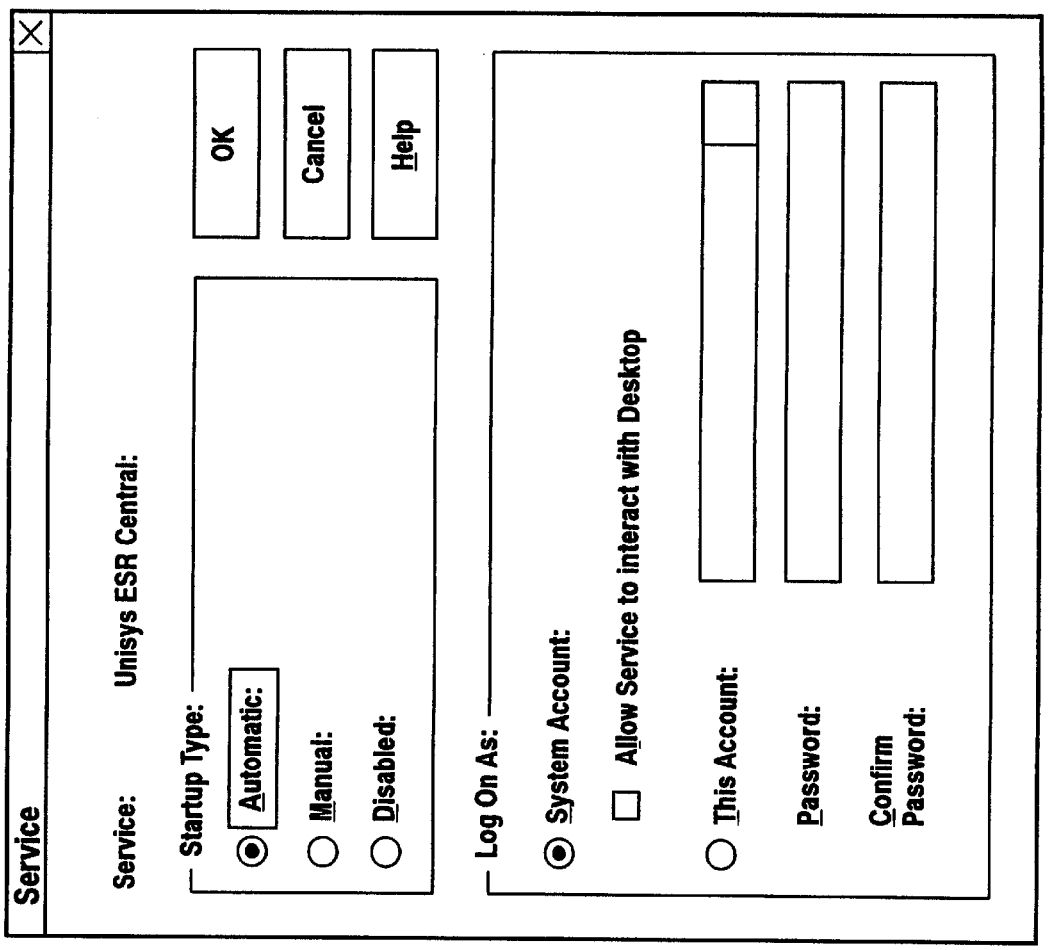
FIG. 5A indicates a Service Window.

The ESR Central Service will receive information on system errors, application errors, or peripheral errors from the Electronic Service Request (ESR) file formatter. This particular information is then included in a data packet that describes the problem and the severity of the problem. The Central Service 30 then schedules and sends the data packet to the Remote Communications Interface (RCI) which is in the support center. The Central Service has both full recovery and also a retry algorithm when communicating to the Remote Communications Interface (RCI). This service runs at the system start-up and it can be stopped and started by using the services function of the Windows NT control panel applet. The Windows control panel applet is shown in FIG. 5.

The Master Partition ESR Central Service 30 provides for central processing and the management for all types of these ESR packets which describes the problem and its severity. This provides an open solution because any application can send a ESR packet to the Central Service Unit that handles the receiving, sending, scheduling, monitoring, and fault recovery of ESR packet sending over to the Remote Communications Interface (RCI).

The Electronic Request Central Service 31 is actually a component that is easily integrated with any type of ESR (Electronic Service Request) detection and generation programs. Further, the Central Service Component is reusable and capable of communicating with any sort of applications running from different operating systems which are using the standard WINSOCK protocol. The Electronic Central Service is a reusable module and has the advantage of using an industry winsock standard to communicate with other components to deliver a complete electronic service request solution.

The Electronic Service Request Monitor is a Windows application used to configure information required by the Central Service and to view information about Electronic Service Request packets that have been received and processed by the Central Service.

The Remote Communications Interface (RCI) 52 is an application that receives an Electronic Service Request packet from a Formatter program 26 by way of the Central Service and delivers the request to the appropriate service provider for action and resolution.

MAJOR FEATURES OF ESR CENTRAL SERVICE: The ESR Central Service System will be seen to provide multiple features as follows:

(a) Multi-threaded asynchronous operations for all ESR receiving, scheduling, and sending processes.

(b) Ability to receive ESR packets from multiple formatter programs located on local host or remote host.

(c) Provides ESR status tracking though a database, according to receiving, scheduling and sending processes.

(d) Microsoft Component Object Model (COM) interface provided to enable the ESR monitor or scripting languages to access the ESR service database for status and configuration.

(e) Provides automatic delivery of all ESR packets according to a user-defined schedule.

Figure 4A:
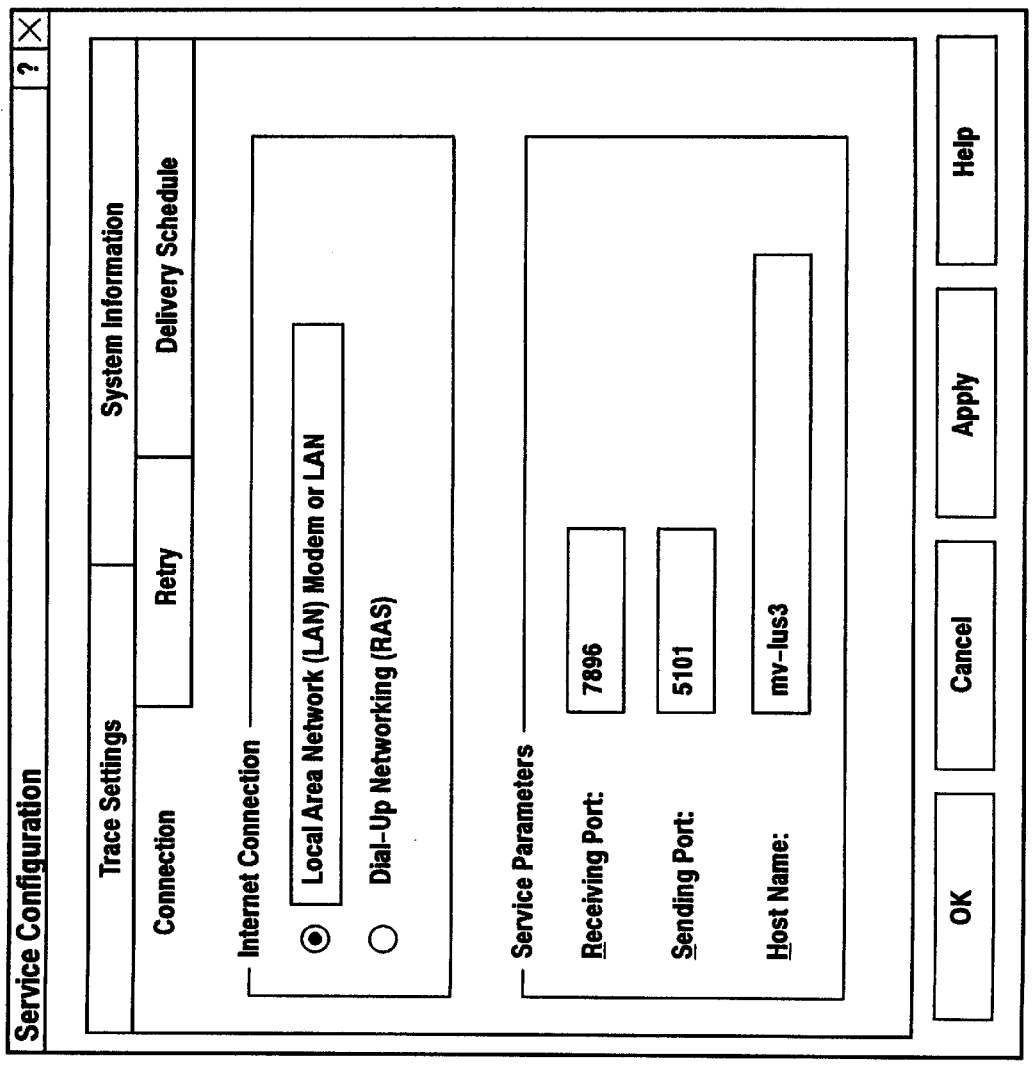
FIG. 4 shows screens for the windows applicable to the ESR Monitor for Service Configuration and indicated as FIGS. 4A, 4B, 4C, 4D, and 4E.

(f) Provides dynamic ESR scheduling service so that any changes to the delivery schedule should take effect immediately. This is utilized through the window screen shown in FIG. 4D.

(g) Provides automatic access through a Local Area Network (LAN) or a dial-up networking connection to the Remote Communications Interface (RCI).

(h) Provides recovery capabilities, so that in case of a system failure all queued ESR packets are recovered and rescheduled for delivery to the Remote Communications Interface (RCI) automatically after a system re-start.

(i) Provides two retry facilities. The dial-up networking facility is used to automatically re-dial the Unisys network when the phone line is busy. The connection retry facility is used to redial to RCI after a successful dial-up networking connection.

(j) Provides a testing facility. ESR test packets can be sent to verify the integrity of the entire ESR mechanism from the ESR generator service to the ESR Central Service or to the RCI (Remote Communications Interface).

(k) Provides an extensive trace facility to track the problems and the processes involved.

(l) Provides for reporting of status information and error information to the Windows NT event log.

Figure 8:
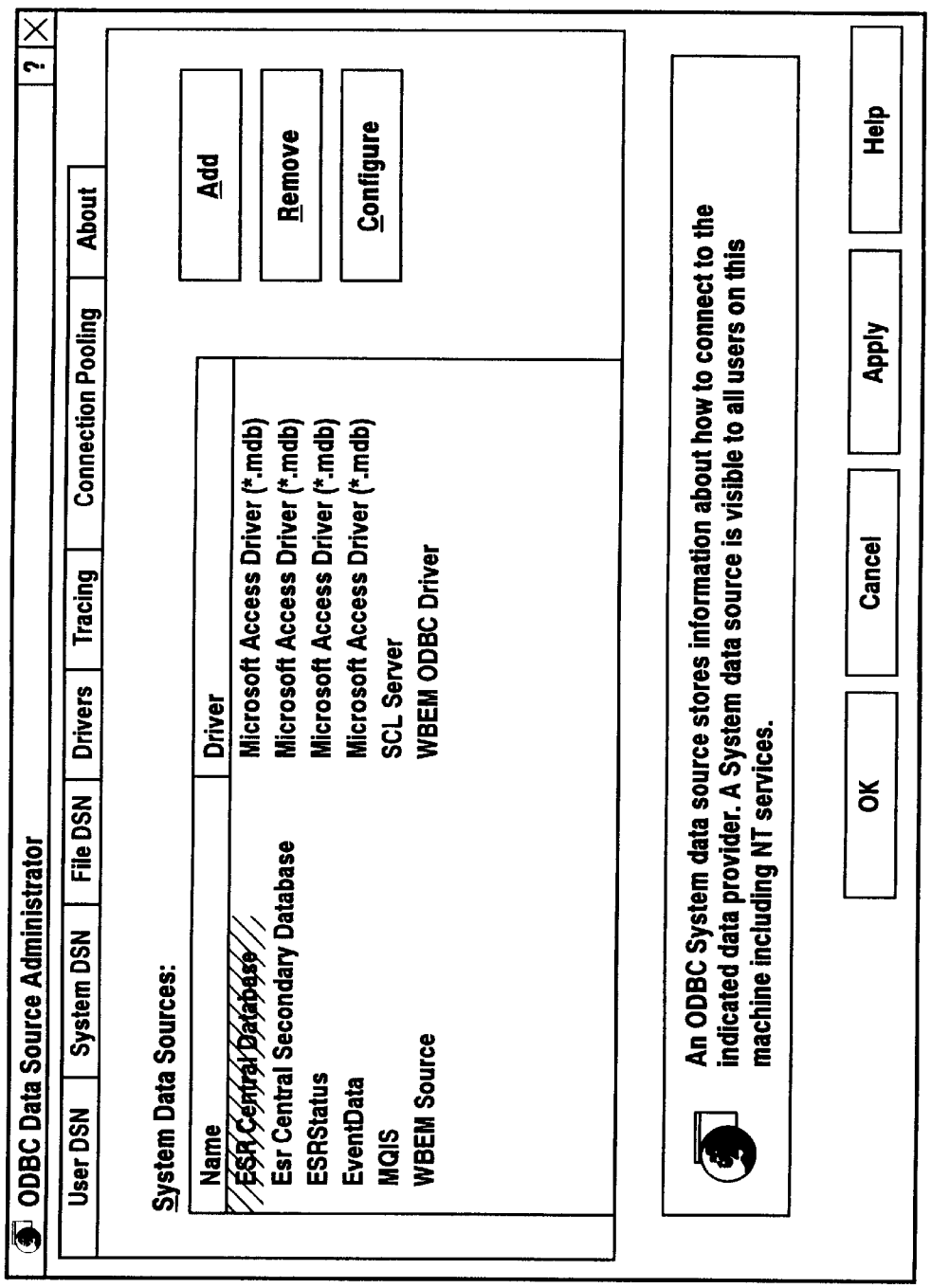
FIG. 8 is a screen showing the ODBC Data Source Administrator.
Figure 9:
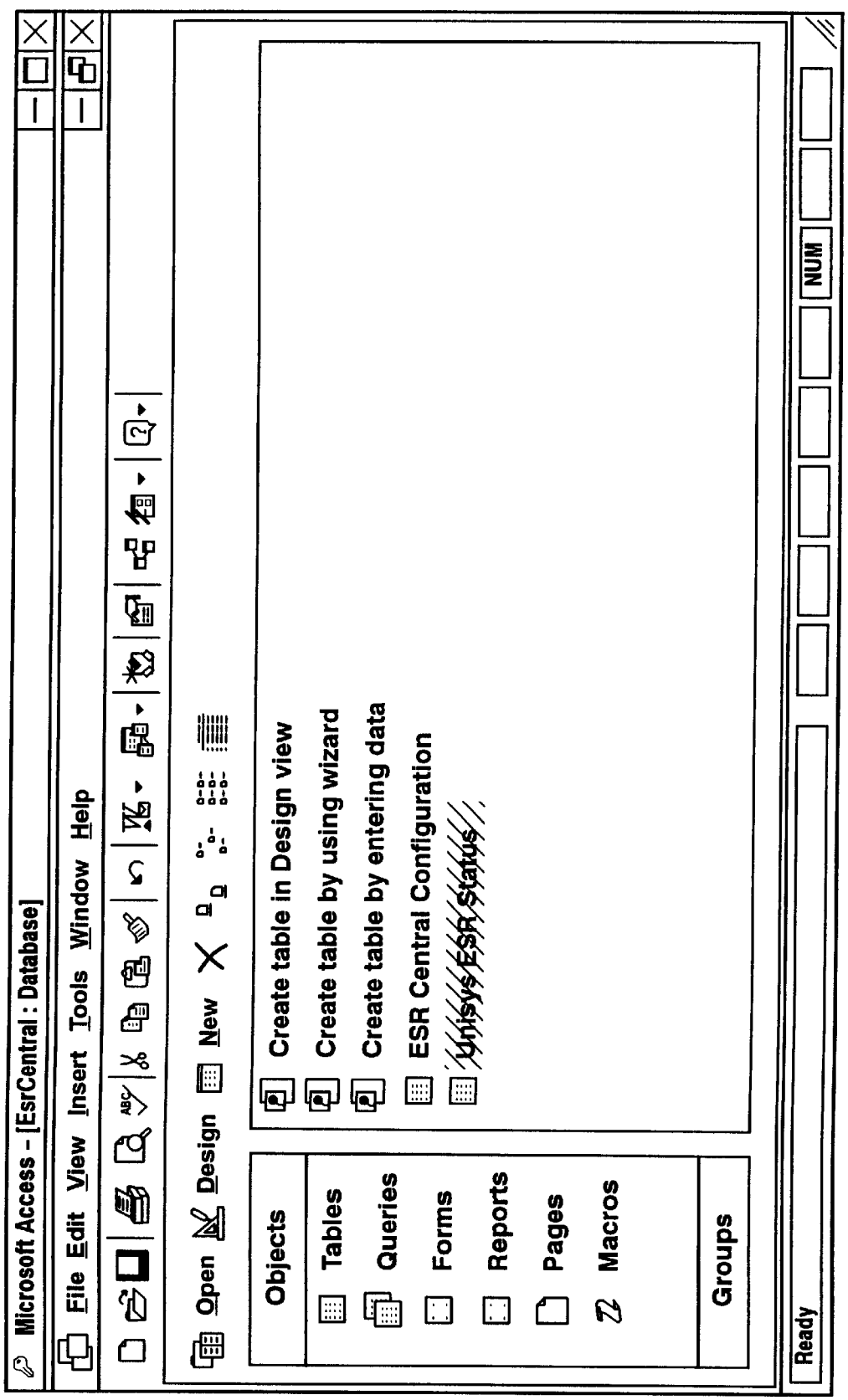
FIG. 9 is a screen showing the Electronic Service Request Central Service database access.

ESR CENTRAL SERVICE DATABASE: The ESR service database, as seen in FIG. 9, is a Microsoft Access database that is configured as a System Data Source Name (DSN) in the ODBC (Open Database Connectivity) data source indicated in FIG. 8. The System Data Source Name (DSN) has two tables:

(i) ESR Configuration Table; and (ii) ESR Status Table:

These tables keep track of the ESR configuration and status information.

An ODBC system data source stores information about how to connect to the indicated data provider. The system data source is visible to all users on the machine, including two NT services. This is all handled by the ODBC Data Source Administrator, as seen in FIG. 8.

CS (CENTRAL SERVICE) RECEIVING SERVICE: A Formatter program 26 can send Electronic Service Request (ESR) packets to the Central Service 30, either locally or remotely. After the System Administrator 28 uses the ESR Monitor User interface 50 to set-up the communication port number, the Master Partition Computer (CS) 30 can be started and ready to receive ESR packets through that communication port 27 according to the ESR protocol specification.

This ESR Monitor User Interface 50 (UI) has a window designated for Service Configuration, as seen in FIGS. 4B–4E. It can be used to set up an internet connection via the Internet of Local Area Network (LAN) or the dial-up networking or Remote Access Service (RAS) to the support center. Additionally, it shows certain service parameters such as the number of the receiving port, the number of the sending port and the host name.

EXTENSIVE TRACE FACILITY: The Electronic Central Service 30 has a comprehensive trace facility for tracking problems and processes. A series of specific software steps are defined which enable the tracking of problems and processes.

Figure 9A:
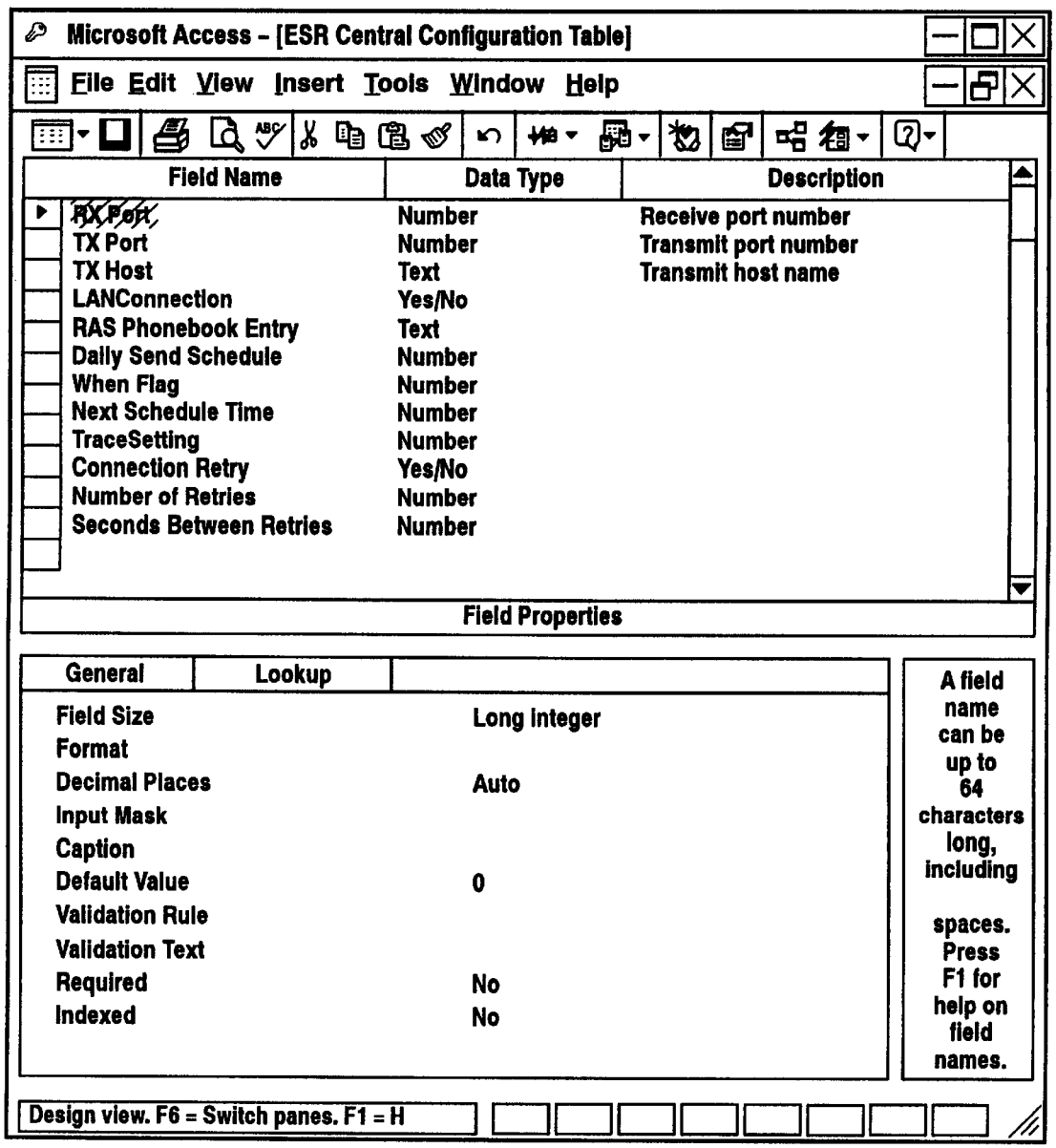
FIG. 9A is a screen showing the ESR Central Configuration Table.

The ESR Monitor application has a Trace Setting property sheet in order to set the Trace Setting (FIG. 4E) in the ESR Central Configuration Table (FIG. 9A). This table defines certain categories and gives each one a hexadecimal value and also a decimal value. Table I provides a definition list for the Trace Setting field value.

TABLE I

// Tracing Activation Bits (Run-Time Configurable)

| // Define | Hex Value | | Decimal Value |
|---|---|---|---|
| // ---------------- | ----------- | | -------------- |
| #Define T_Flow | 0x00000001 | // 1. | 1 + 96 = 97 |
| #Define T_Status | 0x00000002 | // 2. | 2 + 96 = 98 |
| #Define T_IO | 0x00000004 | // 3. | 4 + 96 = 100 |
| #Define T_Class | 0x00000008 | // 4. | 8 + 96 = 104 |
| #Define T_Error | 0x00000010 | // 5. | 16 + 96 = 112 |
| #DefineT_EventLog | 0x00000040 | // | 64-these are always on |
| #Define T_EventLog_Error | 0x00000040 | // 6. | 64 |
| #Define T_EventLog_Info | 0x00000060 | // 7. | 96 |
| #Define T_NextAvailable | 0x00000080 | // 9. | 128 |
| // More Trace Types Here | | | |
| #Define T-All | 0x000000FF | // | 255 |

There are two types of report facilities. These are (i) Application tracing; and (ii) NT event log. Five levels of Application tracing will serve as the process and the problem tracking mechanism. Tracing can be configured through the ESR Monitor User interface 50 shown in FIG. 1. Two levels of NT Event Log will report the NT service-related errors and the necessary information. The NT Event Log mechanism FIG. 3A is always on and is not user configurable.

Figure 4B:
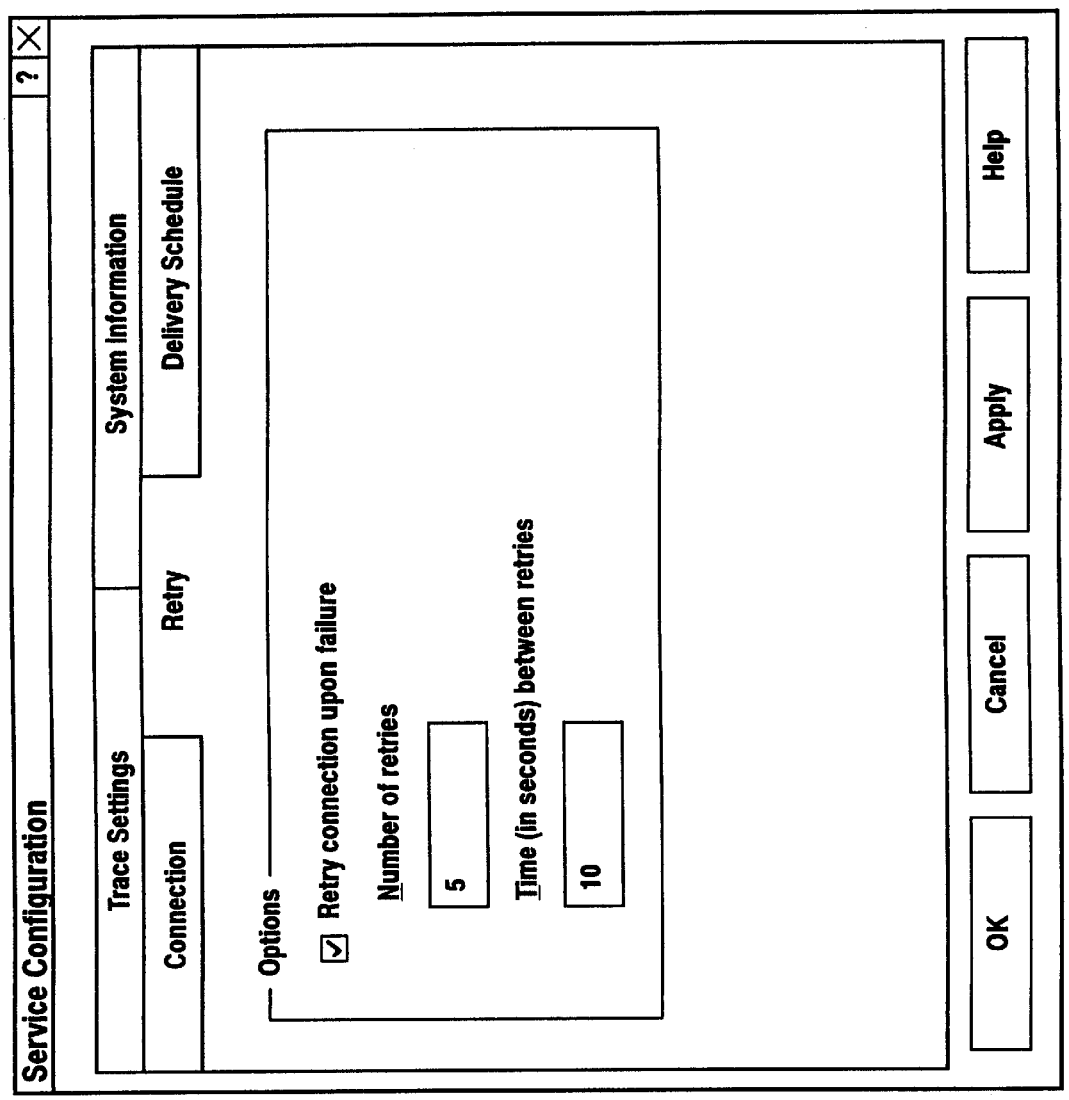
Figure 4C:
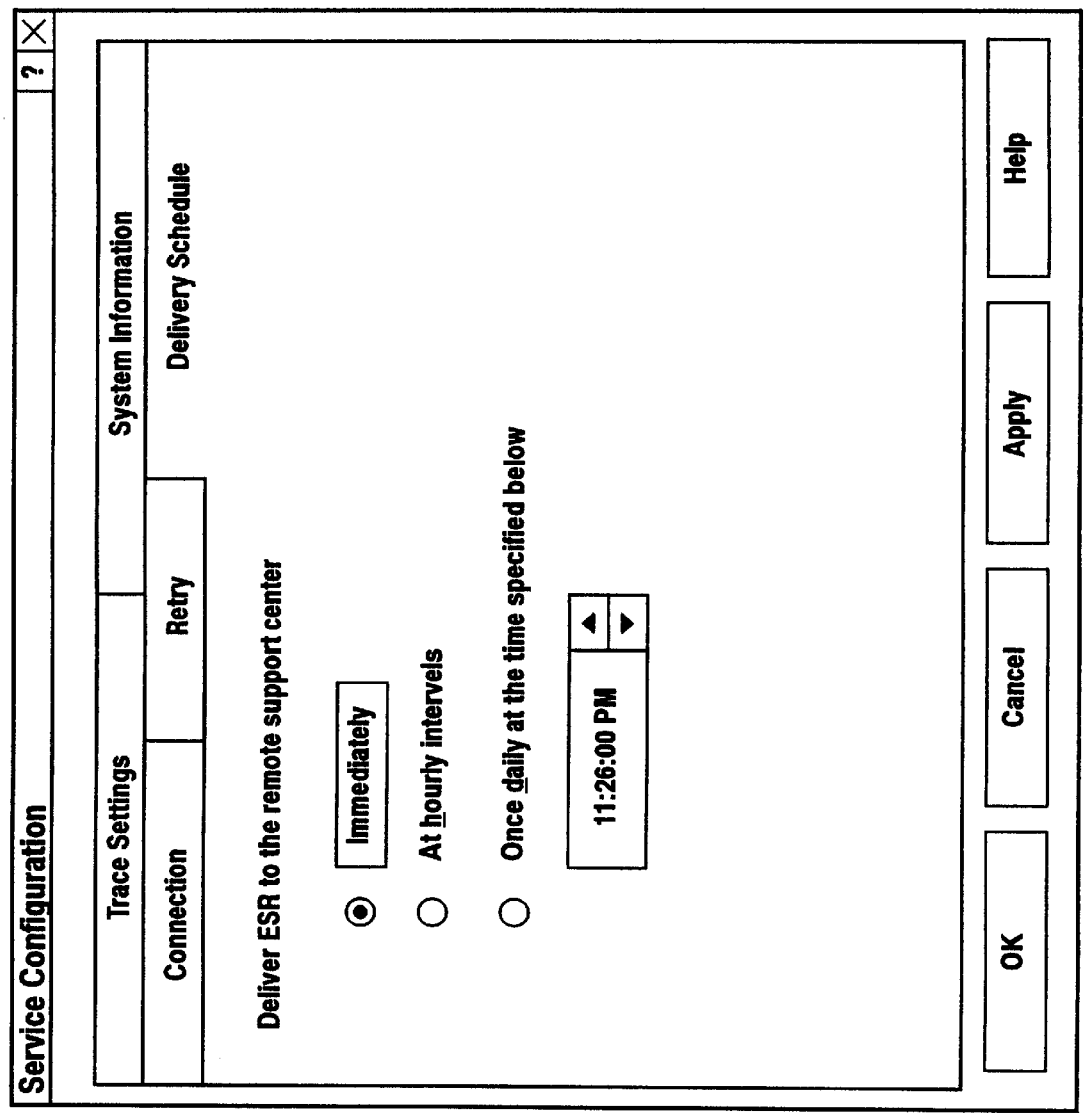
Figure 4D:
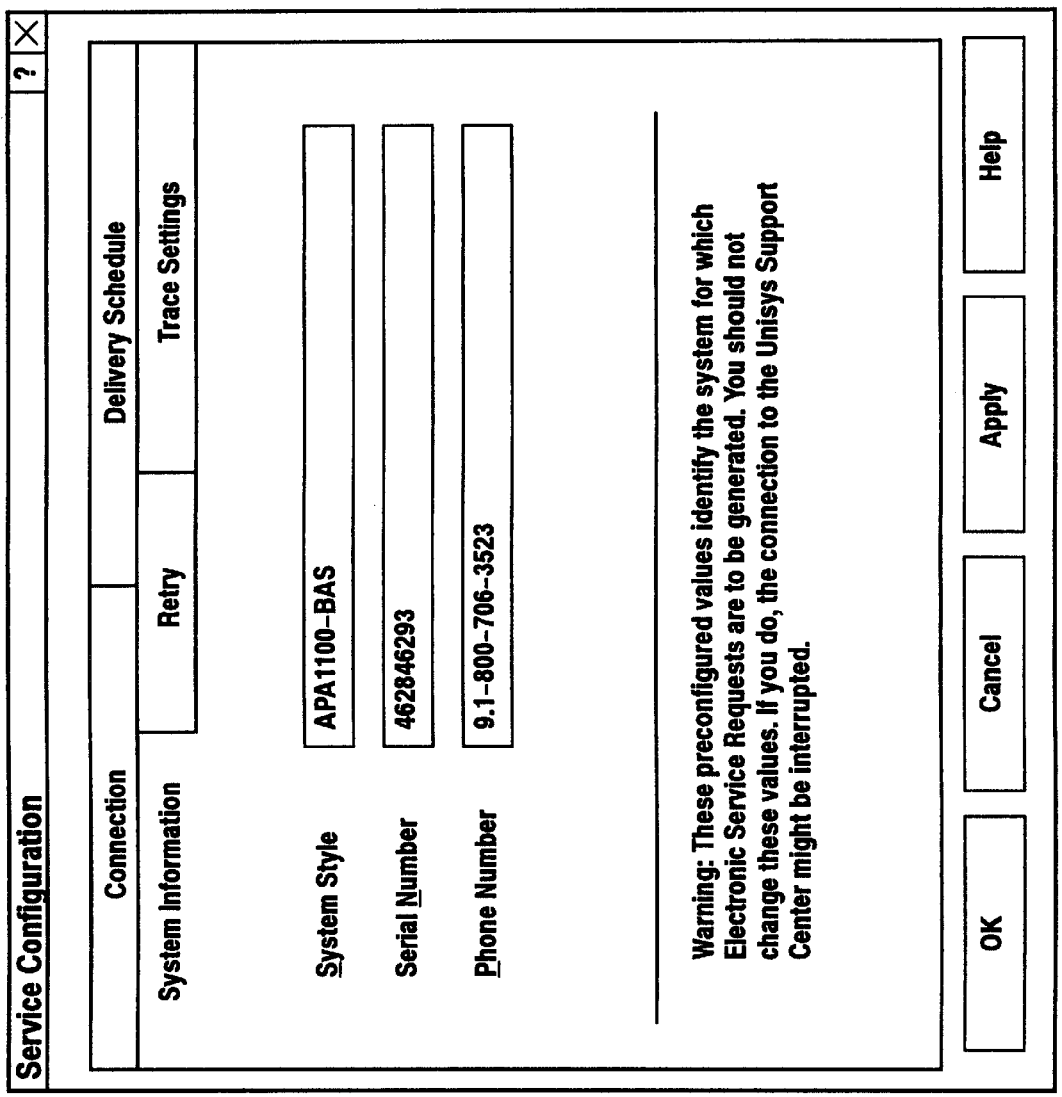
Figure 4E:
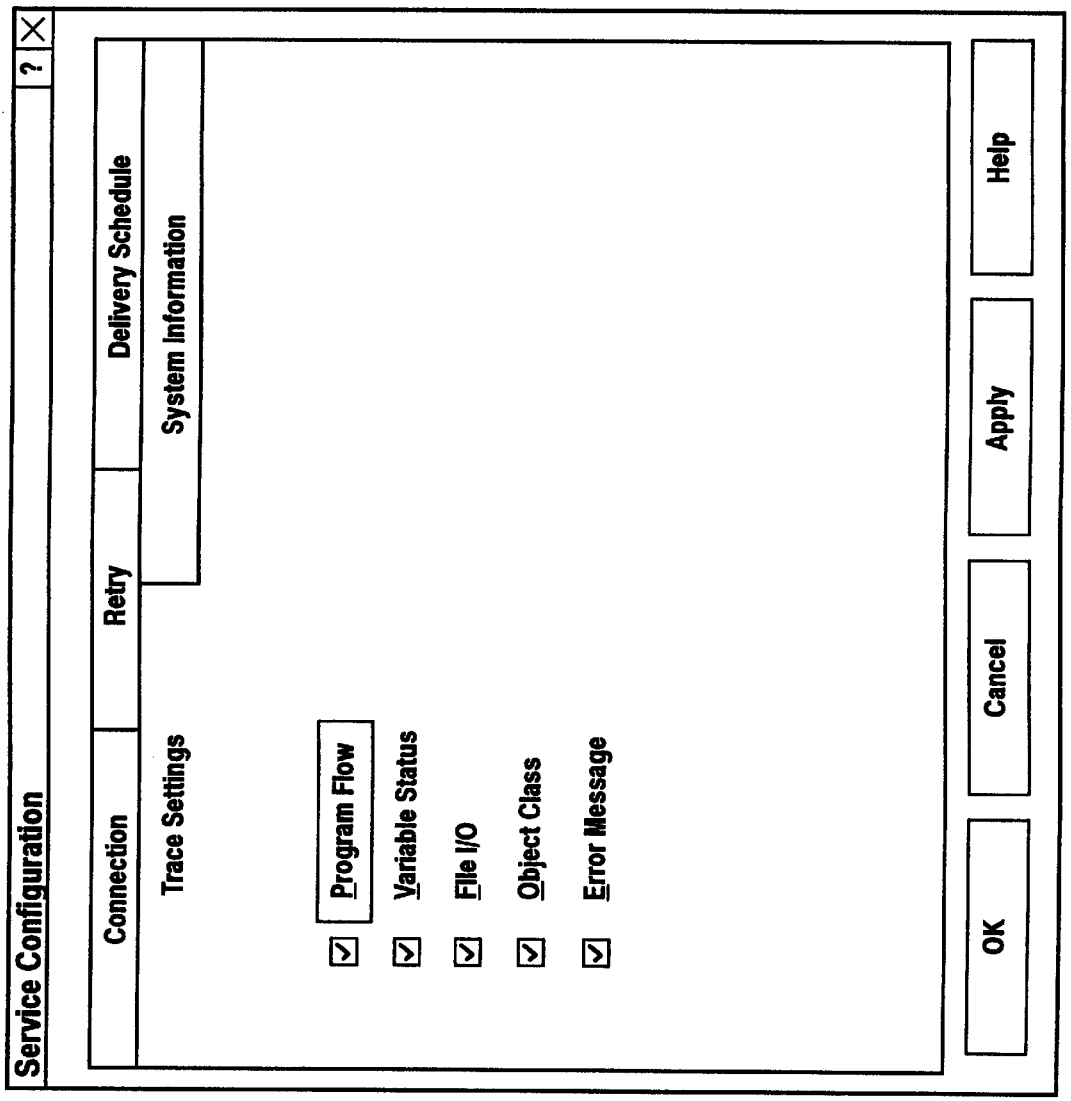

The ESR Monitor User interface Trace Property sheet shown in FIG. 4E contains the following set of check boxes and returns a value to the trace setting as Trace Setting in the Unisys Configuration Table. The check boxes are: (FIG. 4E)
 (a) Program flow
 (b) variable status
 (c) File I/O
 (d) Object Class
 (e) Error message The return decimal value is calculated according to the combination of the check box selections.

DIAL-UP NETWORKING RE-DIAL: In dial-up networking, a user can specify the number of times that the dial-up networking automatically redials when one fails to connect to the NAG (Network Access Gateway). The user can also set the redial to reconnect automatically when the link is dropped because of inactivity.

CONNECTION RETRY: The Central Service 31 handles the connection retry when the Remote Communications Interface 52 (RCI) is not available after dial-up networking connects successfully. There is a Connection Retry Property Sheet for a user to configure this particular feature. This can be utilized via the screen of FIG. 4A.

In order to turn on the Connection Retry, (FIG. 4B) the following procedures are used:
 (a) In the Connection Tab, select Connection Retry box. This will enable the connection retry.
 (b) In the Number-of-Retry-Attempts box, (FIG. 4B) select the number of times the selected entry is automatically retried if the first attempt to connect to the Remote Communication Interface fails.
 (c) In the Seconds-Between-Retry-Attempts box, (FIG. 4B) select the number of seconds to pause between the end of one attempt and the beginning of another. This pause lets the device reset itself before retrying. Here, the default is generally set at 10. This setting can be increased if this is not sufficient time.
 (d) When the above steps have been completed, the operator will then click OK.

The ESR Service Configuration Retry Table is seen in FIG. 4B and includes the following three columns.
 (i) Retry connection upon failure: This is the flag used to turn this feature on and off.
 (ii) Number of retries: The number of times a selected entry is automatically retried if the first attempt to connection to the URCI fails. The default period here is normally set at 10. The maximum value allows multiple more times than just 10 seconds.
 (iii) Time (in seconds) between retries: This is the number of seconds to pause between the end of one attempt and the beginning of the other. This pause lets the device reset itself before retrying. The default here is normally set to 30 seconds. The maximum value can be more extended by thousands of seconds.

ESR PACKET PROTOCOL: When the Electronic Central Service starts up, it opens the receiving port and gets ready to receive ESR packets from the formatter program. After an ESR packet is received and verified, the Electronic Central System 31 will respond with an ESR SACK (successful acknowledgment), or a non-successful NACK packet. The ESR SACK/NACK packet is sent back to the formatter program 26 via the same port as the receiving port. The protocol is the same in both directions. The reply packet, however, also consists of a packet header and packet data.

Protocol Details: The ESR data stream in both directions consists of a: (i) 4-byte preamble, plus 10 byte ESR packet size (decimal) plus ESR data packet.

Packet Header: A packet header is added to the packet sent by the remote system and to the reply packet from the Remote Communications Interface 52 (RCI). This is done because the same port is used for data transfer in either direction and the receiver needs a way to know when the transmission is complete.

The packet header consists of:
 (i) A Preamble Field: This is a 4-byte field to indicate the start of an ESR transaction. The value in this field can be a code word, for example "WOOD".
 (ii) Data Length Field: This is a 10-byte ASCII field containing the decimal size, in bytes, of the data packet which will follow.
 The size in the Data Length Field does not include the size of the preamble or the data length field—only the ESR data packet. This field is right-justified and zero filled.

Packet Data: This contains the ESR packet data bytes as defined in the packet.

SEND TEST PACKET: There are three ESR test packets which are defined for the Electronic Central System to test-out the ESR process with the remote communication interface (RCI). These include:
 (a) Packet Type Equal ESRDIAG
 (b) Packet Type Equal ESRRFU
 (c) Packet Type Equal ESRTEST
 (d) The procedures for transmitting test packets are identical to regular (Service Request) SREQ packets (this is the regular packet) with the exception of the PktID field. All differences in processing of the test packets are the responsibility of the Remote Communications Interface (RCI) and the service management applications.

ESRDIAG PACKET: This test packet is used by the CSS (Central Service System) personnel when configuring, testing, or diagnosing the ESR mechanism including:

(i) The ESR application
(ii) The Gateway
(iii) The Internet
(iv) The ESR receiving application (RCI)

On receipt of an ESRDIAG packet, the Remote Communications Interface (RCI) will return a SACK packet or a NACK packet as appropriate, and also a SIMULATED call reference number.

ESRTEST PACKET: The ESRTEST test packet is used to verify that the ESR mechanism is functioning correctly, that is to say, that the electronic service request mechanism is in proper condition. There is provision for both a manual initiation capability for use by the customer or by the field engineer personnel (a "test button") and also provision for a means to programmatically generate ESRTEST packets at fixed intervals (for example, once per quarter).

On receipt of an ESRTEST packet, the Remote Communications Interface (RCI) will validate the packet contents and then return an acknowledgement SACK or NACK, as appropriate.

If the packet is validated through this test, a service request will be placed with the call management system and then immediately cancelled. It should be noted that no attempt will be made to place a service request into the call management system at this particular time. The same action will be taken as was done with ESRDIAG. This will provide the field engineer divisions, a means to report on test activity.

ESRRFU PACKET: This test packet is used as a means to verify the service request process "end-to-end" and route the test packet to a service provider who will respond to the Electronic Service Request (ESR) by calling the site. This will verify that all fields are configured correctly, including the customer contact information.

On the receipt of an ESRRFU packet, the Remote Communications Interface (RCI) will validate the packet contents and return an acknowledgment (SACK or NACK), as appropriate. If the packet is validated, a service request will be placed with a call management system and routed to the service provider. The call management system is part of the Remote Service Center 52.

USER INTERFACE: System administrators can use a "Service Control Panel Applet" (FIG. 5) to configure and check the status of the ESR Central Service.

There is a window designated "Services" which shows various items, such as System Event Notification, Task Scheduler, NetBios Helper, Telephony Service, Unisys ESR Central, UPS, Visual Studio Analyzer, Windows Installer, Windows Management, Workstation, etc. Thus, by clicking on the ESR Central, the operator can configure and check the status of the ESR Central Service.

START-UP OPTIONS: By default, the Electronic Central Service start-up type is set to Automatic Start-Up. It is generally recommended that this automatic setting be kept for maximum usage of the availability and the recovery processes of the Electronic Service Request sending service.

SECURITY (LOGON AS): This is an account which enables the System Administrator to assign an Electronic Central Service logon user account. With this option, the logon user must have the right to access the Dial-Up Network, and also the Unisys ESR status database 32.

FIG. 6 illustrates a screen which shows various Event Sources from the Fault Criteria Database and an Error or warning note which is also shown under "Description" as a particular failure or error.

FIG. 7 shows a Monitor View screen which describes the status of various elements in each computer in regard to the ESR packets which were sent and those waiting to be sent.

Figure 3B:
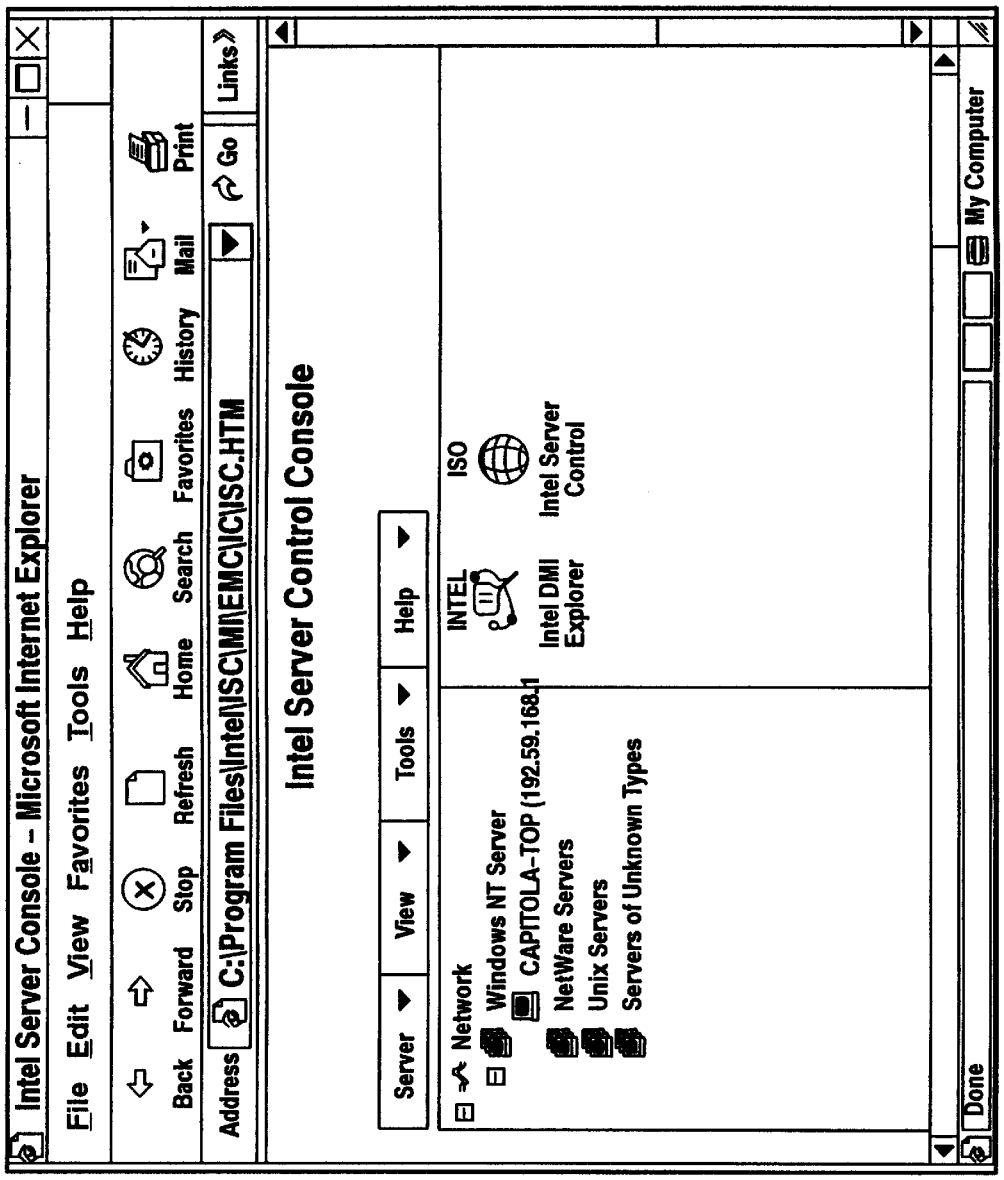
FIG. 3B is a screen for the Intel Server Control Console (ISC) for determining failure.
Figure 3C:
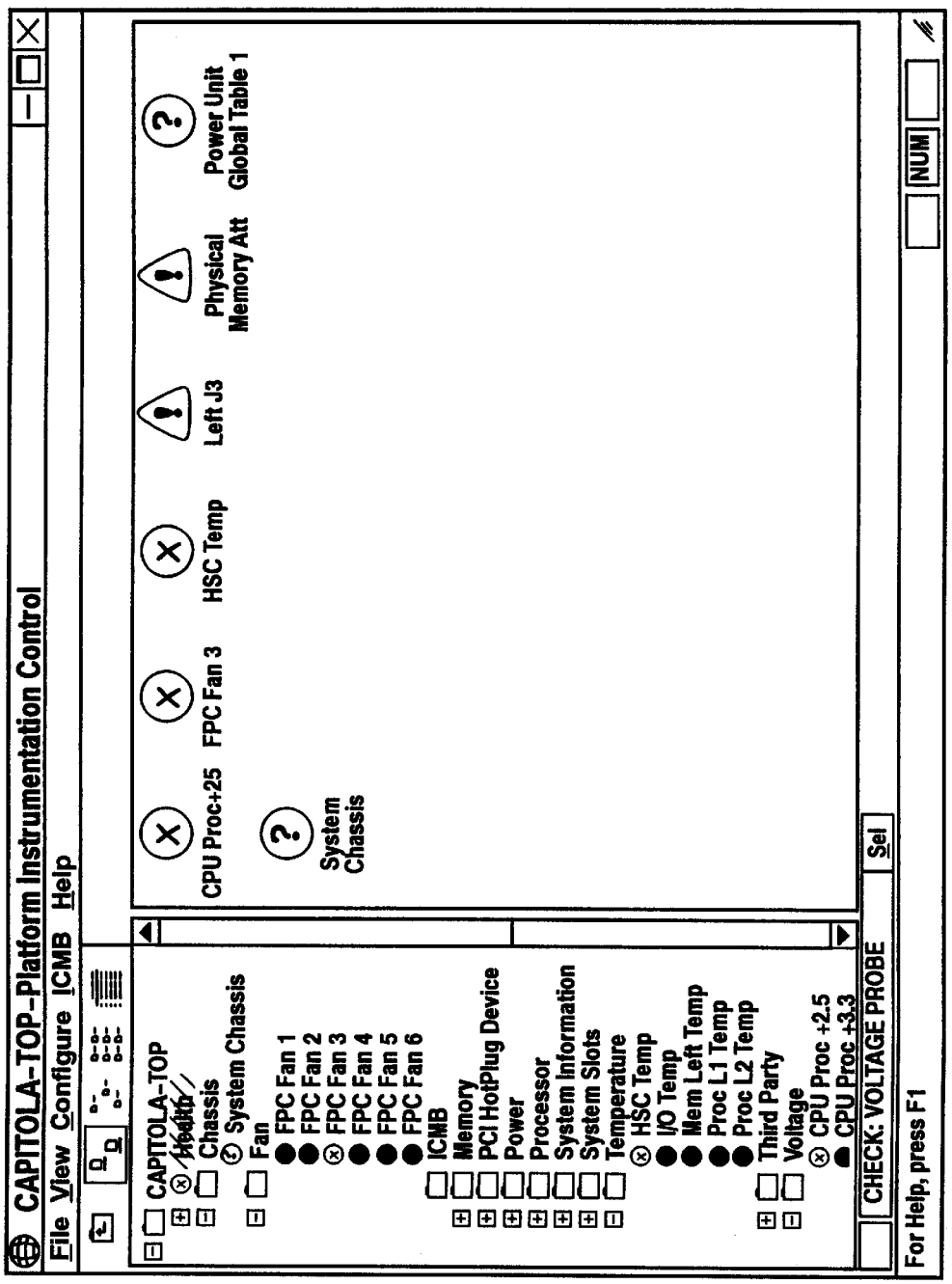
FIG. 3C is a screen for determining component failure.
Figure 3D:
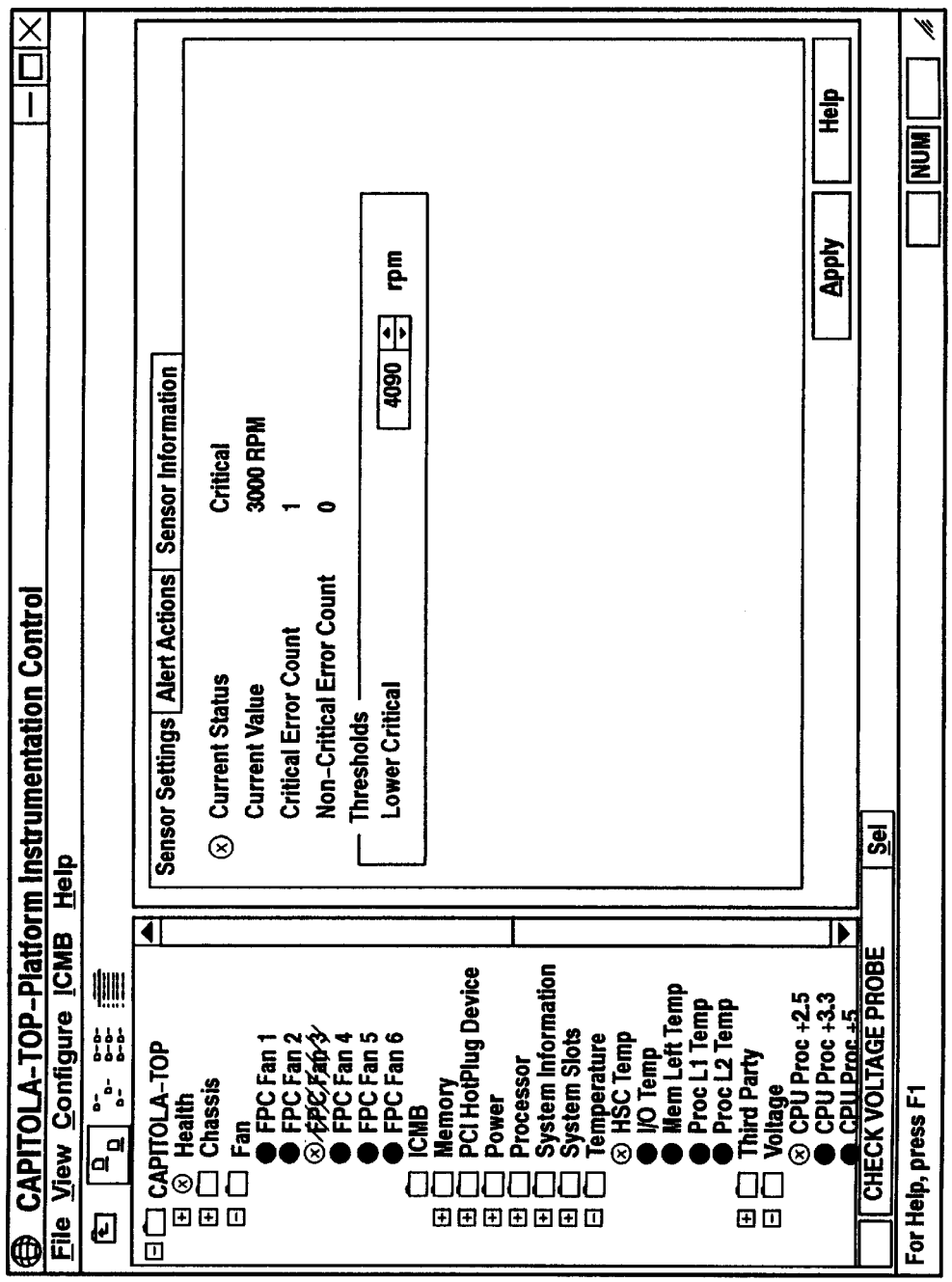
FIG. 3D is a screen for determining fan failure.
Figure 3E:
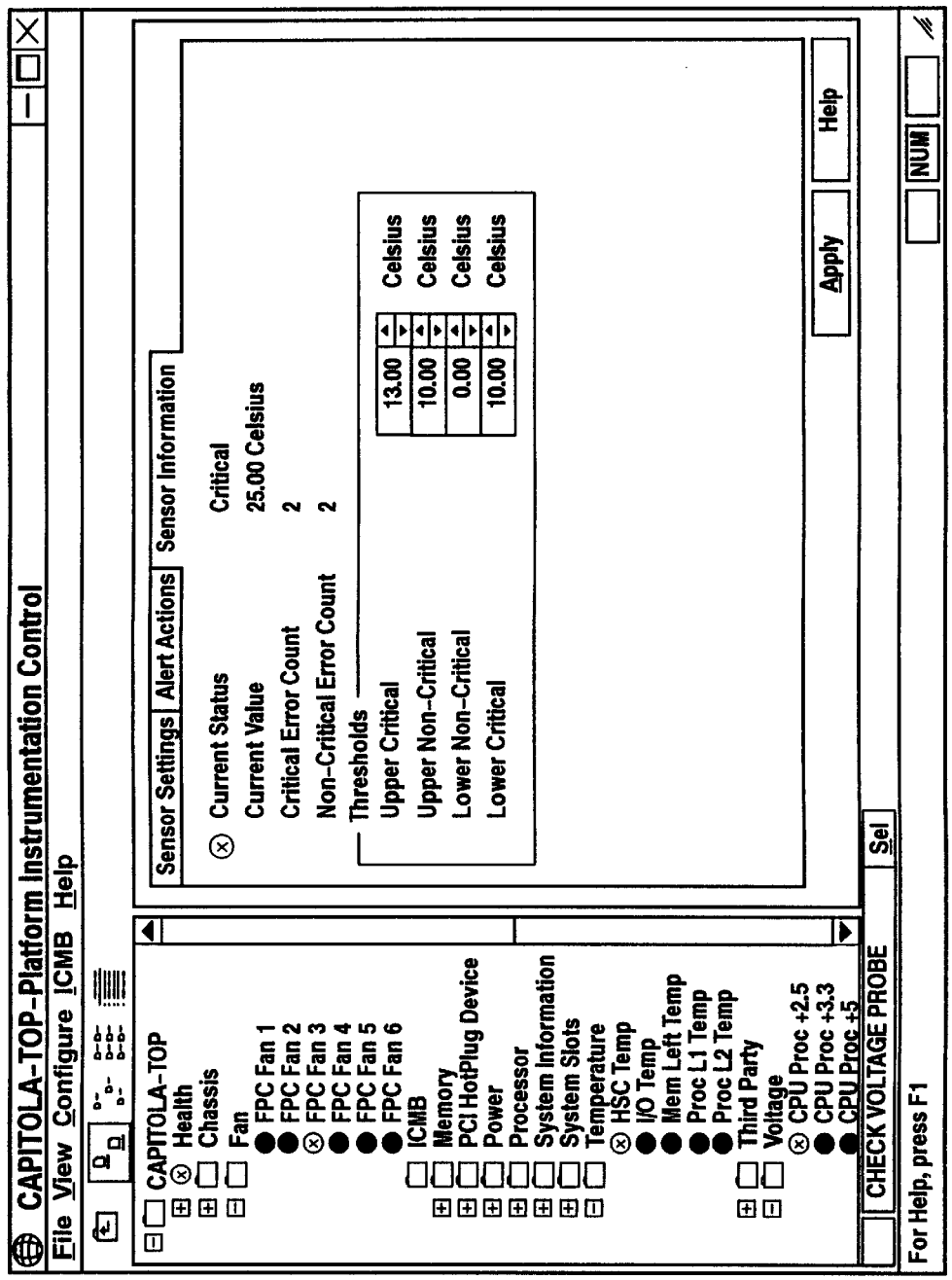
FIG. 3E is a screen for determining Temperature failure.
Figure 3F:
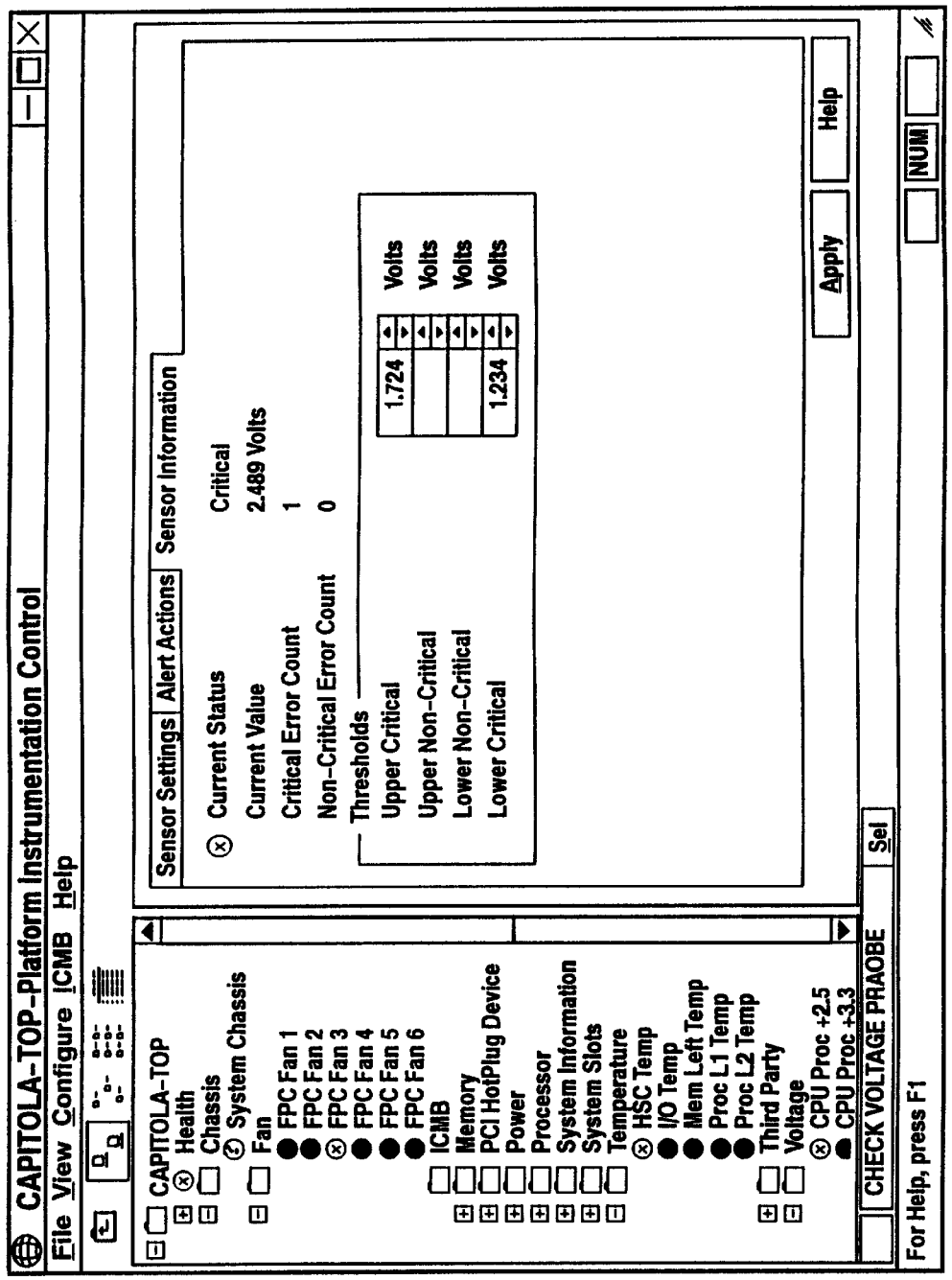
FIG. 3F is a screen for determining voltage failure.

The ESR data packets will contain the error description and then an Intel Server Control Console FIG. 3B will determine the exact component at fault, as seen in FIGS. 3B–3F. FIG. 8 is a screen showing the Data Source Administrator while FIG. 9 shows the screen for accessing tables, configuration or status. FIG. 9A is the server screen for accessing fields in the ESR Configuration Table.

Described herein has been an automatic fault detection system for sensing faults in multiple platforms in a network for hardware/software malfunctions. Each malfunction is event recorded and assessed against fault criteria after which a formatted packet is generated for transmittal to a remote service unit.

While one embodiment of the described system and method has been described, other variations and implementations may be configured but which are still encompassed by the attached claims.

What is claimed is:

1. In an automatic fault management system covering multiple platforms, a system for sensing system or application errors and reporting them to a Central Service Unit, comprising:
    (a) means to sense an error in each one of said multiple platforms, which includes:
        (a1) analysis management means in each said platform for sensing software and hardware operations;
    (b) means to store an Event Log indicating the source and type of error sensed;
    (c) means to compare said sensed error against parameters stored in a fault-detection criteria database said means including;
        (c1) fault criteria parameter storage means for establishing out-of-limit values for said error sensing means;
    (d) means to generate a formatted data packet with information as to the nature of said sensed error, said means including:
        (d1) electronic service request (ESR) generator means for generating a formatted information packet to indicate faults-errors after comparison of parameters in said fault detection criteria database;
    (e) means to transmit said formatted data packet to a remote service site, said means including:
        (e1) Central Service means for receiving said packet and scheduling the delivery to said remote service site.

2. A method for sensing and reporting on software and hardware malfunctioning items in a network having multiple platforms comprising the steps of:
    (a) establishing an analysis module in each platform to monitor hardware and software operations;
    (b) providing a group of parameters to establish fault criteria for hardware and software operations;
    (c) establishing the presence of software and/or hardware malfunctioning items by comparing the output of said analysis module with said fault criteria parameters, including the step of:
        (c1) listing said hardware and software malfunctioning items in an NT Event Log;
    (d) generating a formatted packet to carry fault information to a master partition/computer, including the steps of:
        (d1) formatting, from said NT Event Log, an electronic service request packet for each platform, which provides specific information as to the hardware and software faults detected;

(d2) utilizing an administrative user interface to monitor and view each of said formatter packets generated;

(e) transmitting said fault information, via said master partition/computer, to a remote service site, including the steps of:
  (e1) storing each of said formatted packets in a status database;
  (e2) scheduling a time period for transmittal of each one of said formatted packets to a remote service site;
  (e3) providing a configuration database for holding network configuration information, connections for retry operations, and delivery schedules;
  (e4) monitoring said configuration database via a user-interface monitor unit;
  (e5) sending a test packet to said remote service site;
  (e6) transmitting an acknowledgment signal from said remote service site to said administrative user interface;

(f) receiving said transmitted packet by a remote service site for analysis and a return response to said master partition/computer.

3. An automatic fault management system for sensing and reporting on multiple platforms in a network to detect hardware and software malfunctions, said system comprising:

(a) fault-sensing means to detect software and hardware malfunctions in each platform, said means including:
  (a1) a hardware/software analytical module in each of said platforms;
  (a2) a fault criteria storage means to compare parameters to determine which items are in a state of malfunction;
  (a3) Event log means for storing lists of malfunction items for each platform;

(b) means to generate formatted packets of information identifying each said malfunction item in each said platform, said means including:
  (b1) electronic service generator means for placing each said malfunction information item in an NT Event Log;
  (b2) administrative means for initiating and monitoring the transmittal of said formatted packets from said NT Event Log;

(c) means to transmit each of said formatted packets of said malfunction information items to a remote service site, said means including:
  (c1) master partition/computer means including:
    (c1a) an electronic service request status database to maintain status information on each formatted packet;
    (c1b) an electronic service request database for holding system configuration information and packet delivery schedules;
    (c1c) an electronic service request monitor user-interface for viewing information in said configuration database;

(d) means to return acknowledgment information from said remote service site to said electronic service request status database and to said means to generate formatted packets.

4. The system of claim 1 wherein said Central Service means (e1) includes:
  (e1a) an ESR Status Database means to receive, store and maintain the status of Electronic Service Request Packets (ESR) received and sent out;
  (e1b) Electronic Service Request Configuration Database means for providing a selected delivery schedule of ESR packets and a selected number of retry transmission operations for incomplete ESR packet transmissions;
  (e1c) an ESR Monitor User Interface to enable a user to view a display of ESR packets received by said Central Service means;
  (e1d) scheduling and sending means for providing a choice of selected time-period for sending said ESR packets.

* * * * *